Sept. 20, 1966 E. D. GIBSON 3,274,582

INTERDIGIT INTERFERENCE CORRECTION

Filed Aug. 25, 1961 2 Sheets-Sheet 1

Sept. 20, 1966 E. D. GIBSON 3,274,582

INTERDIGIT INTERFERENCE CORRECTION

Filed Aug. 25, 1961 2 Sheets-Sheet 2

United States Patent Office 3,274,582

Patented Sept. 20, 1966

3,274,582

INTERDIGIT INTERFERENCE CORRECTION

Earl D. Gibson, Hyattsville, Md., assignor to ACF Industries Incorporated, New York, N.Y., a corporation of New Jersey Filed Aug. 25, 1961, Ser. No. 133,936
7 Claims. (Cl. 340—347)

This invention relates to apparatus for simultaneously compensating for both amplitude and phase distortion, such as may occur in a transmission system of a wire line or any other type, and particularly to apparatus which adjusts the signal during each unit of time as a function of the signals occurring during the nearby time units, thereby compensating for the distortion due to the interference between successive signals.

In the transmission of digital data over many devices and systems of limited bandwidth, distortion seriously limits the attainable transmission rate and reduces the reliability. In practical systems for the transmission of digital data, the extent to which the distortion can be reduced is limited. In many installations, the conventional amplitude and delay equalization techniques have been developed to a point beyond which any significant additional reduction in the distortion would cost excessive equipment complexity. Once it is noted that, in general, the most significant difference between high speed transmission and low speed transmission is the distortion, it becomes obvious that the importance of distortion compensation to high speed data transmission cannot be over emphasized. It is, therefore, one object of the invention to provide relatively simple apparatus to compensate for digital data distortion produced by a transmission system or other digital data apparatus.

It is another object of the invention to compensate for the interference between successive bits or digits.

It is another object of the invention to provide an equalizer for digital transmission systems which is continuously and easily adjustable, stable and reliable.

It is another object of the invention to correct at the input end for intersymbol interference of a digital data transmission system.

It is still another object of the invention to increase the rate of digital data transmission by converting the data from a given code to a code having a higher radix and correcting for interdigit interference.

It is a more specific object of the invention to convert binary code data to quaternary code data and simultaneously compensate for distortion of the quaternary digits due to interference therebetween.

According to the invention interdigit or intersymbol interference is reduced by combining each pulse or digit with a portion of one or more neighboring pulses, whose amplitudes and polarities are adjusted in accordance with the interference characteristics of the system traversed by said data. According to another feature of the invention the interference compensation is produced by apparatus which simultaneously converts the incoming data digits to a lesser number of digits of a code having a higher radix than that of the incoming digits.

The invention will be understood and other objects and advantages thereof will become apparent from the following description and the accompanying drawings, in which.

In what follows the word "digit" will apply to the radix involved. For example, when quaternary codes are being discussed, the word "digit" will mean the same as "quaternary digit." Unless otherwise stated, non-return-to-zero codes will be assumed, regardless of the radix. The apparatus can be used, however, with return-to-zero codes. The signal at the point where the code must be recognized within the receiving equipment will be referred to as the "decisive" signal. At any given point within the system, a "relative" signal amplitude of unity is equal to the absolute amplitude of the difference between the signal for the continuous transmission of "ones" (direct current) and the signal for the continuous transmission of "zero" (also direct current), regardless of the radix.

Any signal can be considered as composed of "component pulses" of equal width. Herein, the term "pulse" refers to one of such "component pulses." Unless otherwise stated each pulse is equal in width to one bit or digit and thus represents said bit or digit. However, the type of equipment described herein can perform distortion correction based upon using more than one pulse to represent one bit or digit.

The terms "interdigit interference" and "intersymbol interference" are used interchangeably to refer to the important distortion effect whereby the signal received for each digit depends upon the values of the immediately preceding and the immediately following digits.

Figure 3:
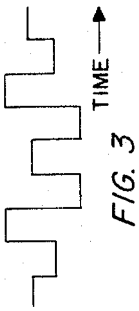
FIG. 3 is a diagram of a series of quaternary digits.

FIG. 3 shows a quaternary code signal, having a radix of four and amplitude values of 0, 1, 2 and 3, as opposed to binary code signals having digit values of 0 and 1. The particular quaternary signal shown in FIG. 3 is 213020312.

Let a combination of digits in any radix be represented by $a_{-4}\ a_{-3}\ a_{-2}\ a_{-1}\ a_0\ a_1\ a_1\ a_2\ a_3\ a_4$, where the $a$'s represent the values of the digits and $a_0$ is the value of the digit under consideration. For example, when this digit combination is the quaternary digit combination 213020312, $a_4$ is a quaternary "two," $a_3$ is a "one," $a_2$ is a "three," etc.

At first, let us assume that the value of each received digit is determined from the center amplitude of that digit alone. The relative amplitude of the decisive signal at the center of the digit $a_0$ can be expressed in terms of the values of that digit itself and the closely neighboring digits. For example, for the frequency response and phase shift characteristics of one system at a transmission rate of 2700 digits per second, the following equation was obtained for the relative, decisive, center amplitude, F(0), at the center of the digit $a_0$:

$$(1)\quad F(0) = -0.01\,a_{-5} + 0.00\,a_{-4} + 0.00\,a_{-3} -0.05\,a_{-2} -0.235\,a_{-1} + 1.02\,a_0 + 0.270\,a_1 + 0.018\,a_2 - 0.001\,a_3 - 0.004\,a_4 - 0.008\,a_5$$

This equation applies regardless of the radix. For any given system, such an equation as this can be very easily and quickly written from the system step response. The system step response can be directly obtained experimentally or, in many cases, it can be rather quickly calculated from the system frequency response and phase shift characteristics.

Equation 1 shows that in a quaternary code, for example, the digit combination which produces the maximum, center amplitude of the digit $a_0$ for any given value of this digit is 0 $a_{-4}\ a_{-3}$ 00 $a_0$ 33000, where the digits $a_{-4}$ and $a_{-3}$ can have any values. The digit combination 3 $a_{-4}\ a_{-3}$ 33 $a_0$ 00333 produces the minimum, center amplitude of the digit $a_0$. For the system represented by Equation 1, the maximum, relative, decisive, center amplitude of the quaternary "zero," for example, is $$3(0.270+0.018)=0.864$$

From the same equation, the minimum, relative, decisive center amplitude of the quaternary "one" is $$1.02-3(0.01+0.05+0.235+0.001+0.004+0.008)=0.096$$

Thus, the maximum "zero" is larger than the minimum "one" and the code cannot be reliably recognized without employing special techniques. The relative margin for error after distortion in this case is $$0.096 - 0.865 = -0.768$$

The frequency response and phase shift characteristics of the system referred to above are very nearly equal to those of one of the best existing systems for the transmission of digital data over telephone lines, with amplitude and delay equalization included in the system. Therefore, some special technique is obviously needed for transmitting quaternary data over most telephone lines.

From equations such as Equation 1 for a variety of data transmission systems and a variety of conditions, it has been found that the amplitude of the decisive signal at the center of a given digit is not significantly affected by the digits farther than four or five digits from the given digit. In fact, the relative, decisive, center amplitude of a digit is determined mostly by the value of that digit itself and the two immediately adjacent digits.

Therefore, it is proposed that for some applications the level transmitted for each digit value be adjusted to compensate for only the intersymbol interference between this digit and the two adjacent digits. Of course, the apparatus can be expanded to compensate for the effects of a greater number of neighboring digits, but a simple device for compensating for only the two adjacent digits is more practical for some applications. Instead of transmitting signal levels with relative amplitudes of $a_{-1}$, $a_0$, $a_1$, etc., it is the purpose of the invention to transmit relative amplitudes of $K_{-1}\,a_{-1}$, $K_0\,a_0$, $K_1\,a_1$, etc., where the K's are automatically adjusted to reduce the effects of the distortion. In order to keep the equipment simple, the value of K is determined from the values of the associated digit and the two adjacent digits. For example, when the system frequency response and phase shift characteristics are such that Equation 1 applies, the following equation is implemented:

$$(2)\quad F(0) = -0.235a_{-1} + 1.02K_0\,a_0 + 0.270a_1 = a_0$$

Since $a_{-1}$, $a_0$, and $a_1$ are known at the transmitter, $K_0\,a_0$ can be solved for. The signal level $K_0\,a_0$ is transmitted instead of the level $a_0$. F(0) is set equal to $a_0$ because it is desired that the relative, decisive, center amplitude of this digit should be equal to $a_0$.

The digits other than $a_{-1}$, $a_0$, and $a_1$ are ignored in this approximate calculation of $K_0\,a_0$. For greater accuracy the $a_{-1}$, and $a_1$ in Equation 2 could be replaced by $K_{-1}\,a_{-1}$ and $K_1\,a_1$, respectively, because the signal levels actually transmitted are represented by $K_{-1}\,a_{-1}$ and $K_1\,a_1$; however, much more complex equipment would be required to store the variable levels $K_{-1}\,a_{-1}$ and $K_1\,a_1$ than fixed levels $a_{-1}$ and $a_1$. Furthermore, $K_1$ has not yet been determined at the time when $K_0$ must be determined. From Equation 2

$$(3)\quad K_0\,a_0 = 0.98a_0 + 0.230a_{-1} - 0.265a_1$$

Similarly, $$(4)\quad K_{-1}\,a_{-1} = 0.98a_{-1} + 0.230a_{-2} - 0.265a_0$$

A series of similar equations can be obtained for $K_{-2}\,a_{-2}$, $K_1\,a_1$, $K_2\,a_2$, etc.

It will now be demonstrated that with these approximate corrections of the transmitted signal levels, the margin for error is greatly increased. Let $F(0')$ be the relative, decisive, center amplitude of the digit $a_0$ when these corrections have been applied to the transmitted signal levels. Then by substituting into Equation 1 a series of terms similar to those given by Equations 3 and 4, the following equation is obtained:

$$(5)\quad F(0') = -0.01(0.98a_{-5} + 0.230a_{-6} - 0.265a_{-4}) - 0.05\,(0.98a_{-2} + 0.230a_{-3} - 0.265a_{-1}) - 0.235\,(0.98a_{-1} + 0.230a_{-2} - 0.265a_0) + 1.02\,(0.98a_0 + 0.230a_{-1} - 0.265a_1) + 0.270\,(0.98a_1 + 0.230a_0 - 0.265a_2) + 0.018\,(0.98a_2 + 0.230a_1 - 0.265a_2) - 0.001\,(0.98a_3 + 0.230a_3 - 0.265a_4) - 0.004\,(0.98a_4 + 0.230a_3 - 0.265a_5) - 0.008\,(0.98a_5 + 0.230a_4 - 0.265a_6) = -0.0098a_{-5} + 0.00265a_{-4} - 0.0115a_{-3} - 0.1031a_{-2} + 0.017a_{-1} + 1.12a_0 - 0.0019a_1 - 0.0542a_2 - 0.00667a_3 - 0.0055a_4 - 0.00678a_5$$

From this expression the maximum, relative, decisive, center amplitude of the quaternary "zero" is 0.059. The corresponding minimum amplitude of the quaternary "one" is 0.526. Thus, to a close approximation, the relative margin for error in quaternary code is $$0.526 - 0.059 = 0.467$$

Thus, by the use of the approximate adjustments in the transmitted signal levels, the margin for error in quaternary code is increased from approximately minus 0.778 to approximately plus 0.467.

Regardless of the radix employed, the distortion compensation can be performed by a device capable of solving equations such as Equations 3 and 4. Since it easier to store data in radix two than in other radices, however, advantages are gained by performing the distortion compensation simultaneously with the radix conversion. For illustrative purposes, let us assume that the data is to be transmitted in radix four. Let the binary digits $B_1$ $B_2$ $B_3$ $B_4$ $B_5$ $B_6$ represent the quaternary digits $a_{-1}$ $a_0$ $a_1$, where both of these digit trains are written in the order of occurrence. For code or radix conversion purposes these two digit combinations are normally written in the reverse orders $a_1$ $a_0$ $a_{-1}$ and $B_6$ $B_5$ $B_4$ $B_3$ $B_2$ $B_1$. Then Equation 3, for example, can be written in terms of the binary digits as follows:

$$(6)\quad K_4\,a_4 = 0.230\,(B_1 + 2B_2) + 0.98\,(B_3 + 2B_4) - 0.265\,(B_5 + 2B_6) = 0.230B_1 + 0.460B_2 + 0.98\,B_3 + 1.96B_4 - 0.265B_5 - 0.530B_6$$

To better visualize the meaning of this equation, consider the case in which the quaternary digits $a_1$, $a_0$ and $a_{-1}$ are 3, 2, and 1, respectively. It is desired to calculate the relative, compensated signal amplitude, $K_0\,a_0$, to be transmitted for the digit $a_0$. In this case, from Equation 3, $$(7)\quad K_0\,a_0 = 0.230 + 1.96 - 0.530 - 0.265 = 1.395$$

Thus, Equations 3 and 6 give the same results, so the same compensated quaternary code can be obtained by using stored binary data as by using stored quaternary data. In general, the equation to be solved by the code converter and distortion compensation device takes the form, $$(8)\quad K_0\,a_0 = M_1\,B_1 + M_2\,B_2 + M_3\,B_3 + M_4\,B_4 + M_5\,B_5 + M_6\,B_6$$

where the M's are constant determined by the system distortion and the B's are binary digits.

Figure 1:
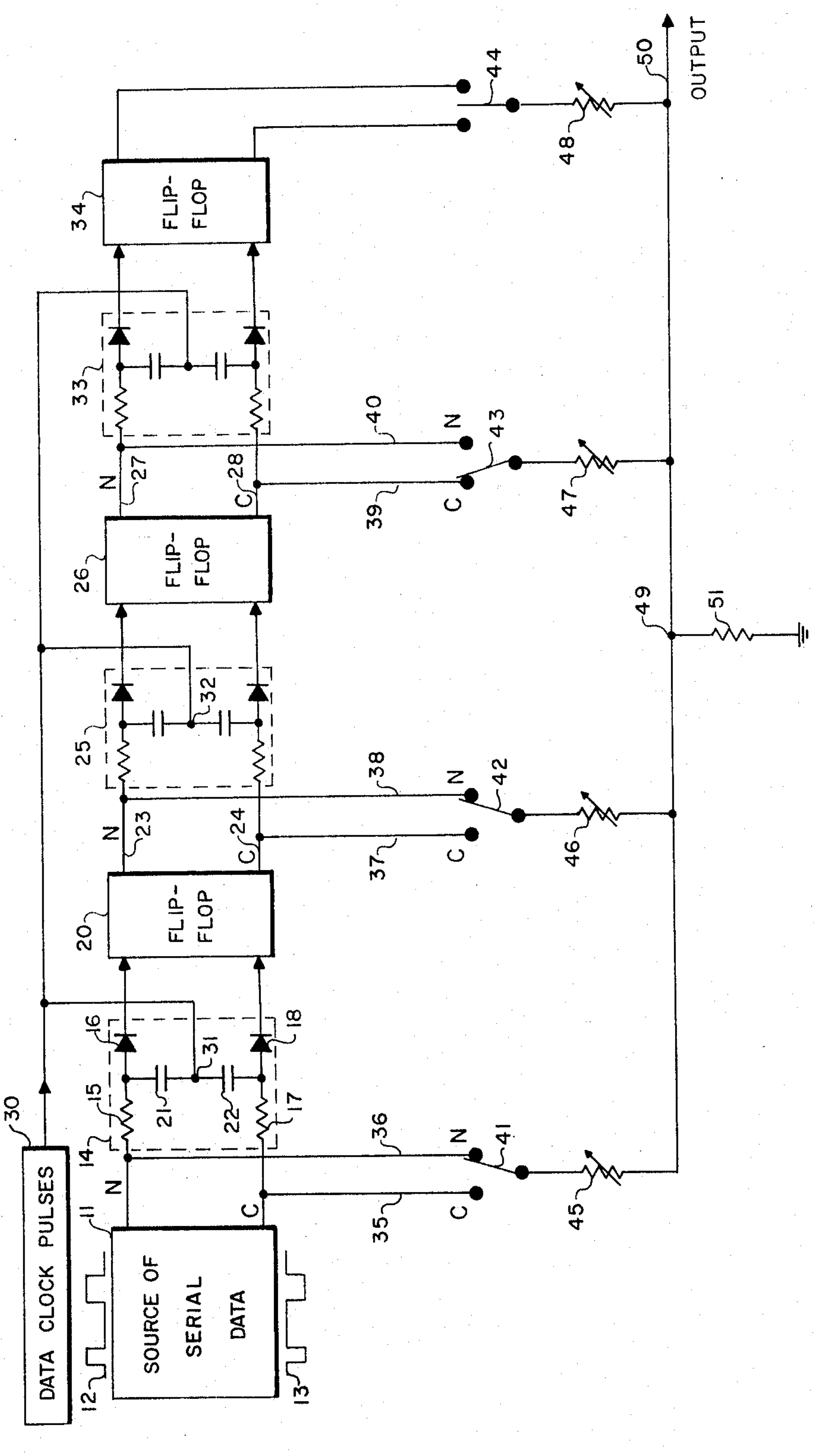
FIG. 1 is a schematic diagram of a distortion compensator according to the invention.

FIG. 1 shows a correction circuit capable of implementing the preceding equations. A source 11 of digital data is arranged to provide a series of digits or pulses 12, called normal or N pulses, and another series of complementary, or C pulses 13 which are the inverse of pulses 12. One set of pulses can be obtained from the other simply by passing the pulses through an amplifier or any other polarity inverting circuit. The N and C pulses are then applied to a dual gate 14 consisting of resistors 15, 17 each connected in series with a rectifier the two junctions of the resistors and rectifiers, capacitors 16, 18 to opposite sides of a flip-flop circuit 20. Between the two junctions of the resistors and rectifiers, capacitors 21 and 22 are connected in series. The flip-flop circuit may be of any suitable type, including, for example, two transistors with the inputs from gating circuit 14 being connected to the bases of the transistors. Output connections 23 and 24 from the two sides of flip-flop circuit 20 provide trains of N and C pulses substantially identical to those applied to the input of flip-flop circuit 20. The output of the latter circuit is connected through gate 25, which is identical to gate 14, to flip-flop circuit 26, which again has two outputs 27 and 28 providing the N and C pulses.

A source 30 of clock pulses having the same pulse rate as source 11, and synchronized therewith, feeds the clock pulses to junctions 31 and 32 of gates 14 and 25. Assuming the data is in the form of a binary code, as shown by pulse trains 12 and 13, the presence of a binary digit 1 applies a positive pulse to rectifier 16 and a negative pulse to rectifier 18, thereby gating rectifier 16 on and rectifier 18 off. The clock pulse impressed on gate 14 at this time will, therefore, pass through rectifier 16 and trigger or hold flip-flop circuit 20 to produce N and C output pulses having a digit value of 1. If a zero value digit is applied to gate 14, rectifier 18 is gated on and rectifier 16 is gated off, circuit 20 is triggered to produce "zero" N and C output pulses. Gate 25 and flip-flop circuit 26 function similarly to produce N and C output pulses.

Additional gating and flip-flop circuits 33, 34 may be connected in series with circuits 14, 20, 25 and 26. It is apparent that these circuits constitute a shift register having two or more stages.

From the outputs of circuits 11, 20 and 26 the N and C pulses are fed over lines 35–40 to switches 41, 42 and 43, which are closed to the N or C sides as required. Connected to each switch is a variable resistor 45, 46, 47 having a common junction 49. The output 50 is taken at junction 49 across resistor 51. The corrected pulses at output 49 are fed to a transmission system or other apparatus whose transmission characteristics are compensated by the circuit of FIG. 1. Elements 41–51 form an adder or summing circuit. Instead of switches 41–43 fixed connections may be used since these connections are determined by the characteristics of the transmission system being corrected and need not be changed unless the transmission system is changed. If it is desired to correct for the interference effect of an additional digit such as $a_2$ or $a_{-2}$ the output of circuit 34 is connected through switch 44 and resistor 48 to output line 50.

To implement Equations 3 and 4 the circuit would be adjusted as follows. Switches 41 and 42 are set to the N side and switch 43 is set to the C side, as shown. (Switch 44 is left open.) If resistors 45, 46, 47 have resistances R1, R2, and R3, a simple nodal analysis of the adder network shows that Equation 3 is solved when $$\frac{1}{R_1}=0.23G,\ \frac{1}{R_2}=0.98G \text{ and } \frac{1}{R_3}=0.265G$$

where G may have any value. The output voltage at line 50 then is $k_0\,a_0$, and this voltage will be transmitted for the length of time of one bit or digit. Then the binary data suddenly shifts one stage to the right in the shift register and a new output voltage appears during the next bit, and this process is repeated for every data bit.

Figure 2:
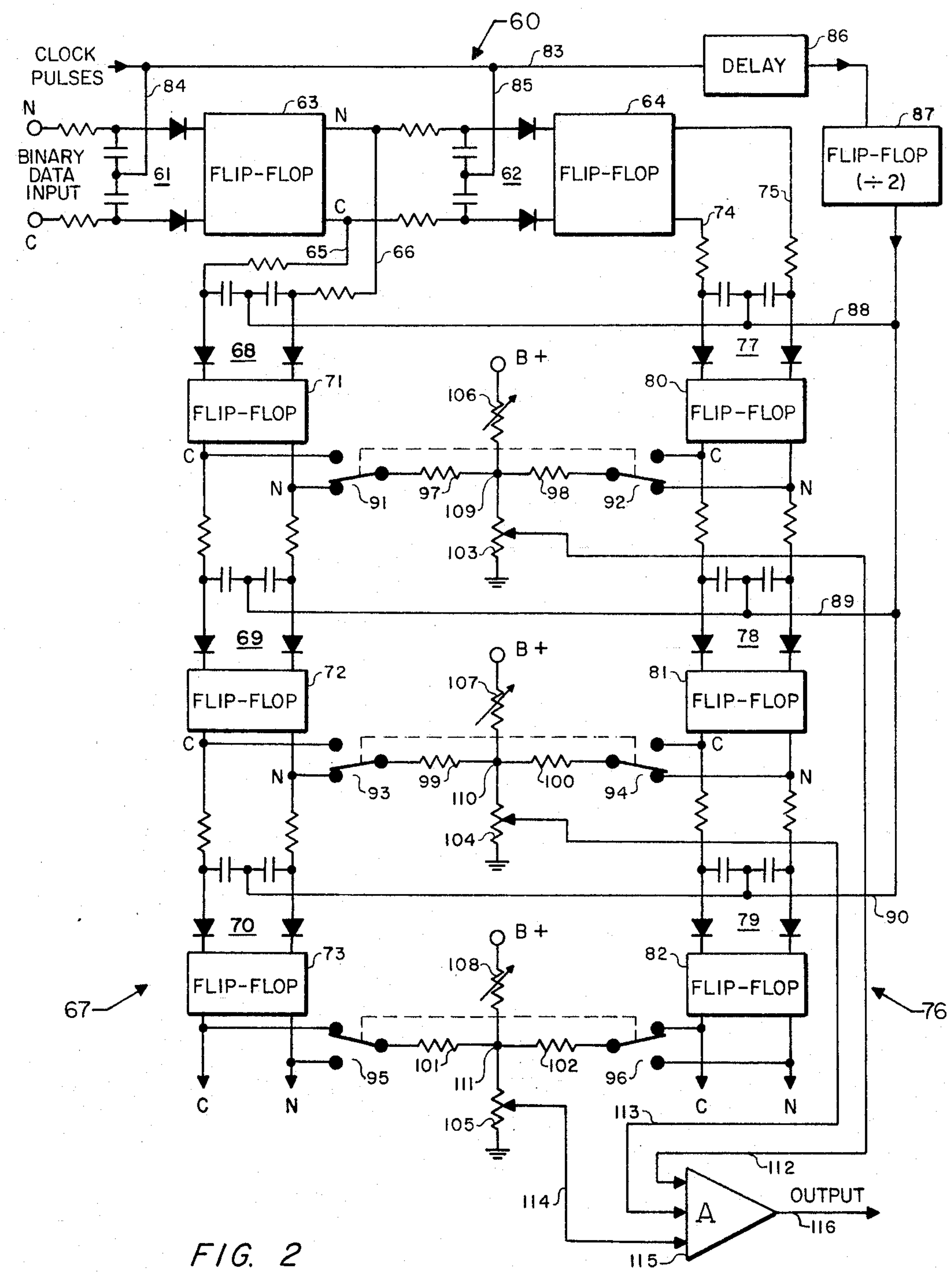
FIG. 2 is a schematic diagram of another embodiment of the invention including a code converter.

The circuit shown in FIG. 2 converts binary data to quaternary data while correcting for intersymbol interference. A binary data source, such as the one in FIG. 1, supplies normal and complementary binary data, N and C, to a two-stage shift register comprising gates 61 and 62 and flip-flop circuits 63 and 64. The output of the first stage 63 is fed by conductors 65 and 66 to a second shift register 67 having gates 68, 69 and 70 and flip-flop circuits 71, 72 and 73. The output of flip-flop circuit 64 is fed by conductors 74 and 75 to a second shift register 76 having gates 77–79 and flip-flop circuits 80–82. Shift register 60 is supplied with shift pulses at the binary data rate by lines 83, 84 and 85 connected to gates 61 and 62. The clock pulses on line 83 are passed through a delay circuit or pulse voltage inverter 86 and a flip-flop circuit 87 which acts as a scale-of-two divider. The output pulses of circuit 87, which have a repetition rate equal to one-half that of the binary data, then are fed over conductors 88–90 to gates 68–70 and 77–79 to shift registers 67 and 76 after every second binary pulse.

The N or C output from each stage of shift registers 67 and 76 is selected by switches 91–96 and fed over resistors 97–102 across potentiometers 103–105. B+ voltage is supplied through variable resistors 106–108 to junction points 109–111, the resistors being adjusted preferably so that the four quaternary voltage levels at points 109–111 are centered about ground, as explained more fully below. The outputs of the potentiometers are supplied by conductors 112–114 to summing amplifier 115 having an output 116. Switches 91, 93 and 95 are preferably ganged with switches 92, 94 and 96, respectively.

Shift register 60 stores two binary digits, with the digit at the output 65, 66 having twice the value of that at output 74, 75. Thus the output at 74, 75 has values 0, 1, while that at 65, 66 has the values 0, 2. These two digits are read out of the several stages of registers 67 and 76 successively. Each stage of register 67, when a binary "one" is stored therein, produces a voltage at junction point 109, 110 or 111 having a digital value twice as large as is produced by the corresponding stage of shift register 76. For example, the N lead of each stage of shift registers 67 and 76 has an output of −12 volts when a binary "zero" is stored therein and an output of zero volts when a binary "one" is stored therein. For example, when switches 91, 92, 93, 94, 95 and 96 are connected to the N leads a suitable set of voltages $V_j$ at junction 109 (and 110 and 111) is given by the following table:

| Binary Digits | Quaternary Digits | Volts, $V_j$ |
|---|---|---|
| 00 | 0 | −6 |
| 01 | 1 | −2 |
| 10 | 2 | +2 |
| 11 | 3 | +6 |

The resistances of resistors 97, 98, 103 and 106 connected to junction 109, for example, are selected to give these four voltages $V_j$ for the four binary combinations. Thus the four valued digits of a quaternary code are produced at point 109. The quaternary digit voltages are then adjusted by potentiometers 103–105 to correct the interdigit interference. The adjusted quarternary code values of three digits appearing at the taps of potentiometers 103–105 are then summed in amplifier 115 to give a quaternary digit which is predistorted to correct for distortion occurring in the system to which output 116 is to be connected. Thus potentiometers 103–105 may be adjusted, for example, in accordance with the co-efficients of Equation 6, to compensate the distortion of the system to which that equation refers.

As an example, let us consider how the binary digits $$B_{10}\,B_9\,B_8\,B_7\,B_6\,B_5\,B_4\,B_3\,B_2\,B_1=0010111001$$

are transmitted by the system for which Equation 1 applies. First, assume that transmission has been in progress for some time and that the digits 111001 are in the shift register. At this time, from Equation 6

$$\text{(9)}\quad K_0\,a_0=E_0=0.230(1)+0.460(0)+0.98(0)+1.96(1)-0.265(1)-0.530(1)=1.395$$

This relative level is transmitted for the quaternary "two," $a_0$, represented by the two binary digits 10, which appear in the two middle stages of the register at the time the computation is made. This signal level is transmitted for a length of time equal to the width of two binary digits. Then, the digit 101110 appear in the register and the following equation is solved, $$\text{(10)}\quad K_1\,a_1=0.230(0)+0.460(1)+0.98(1)+1.96(1)-0.265(0)-0.530(1)=2.37$$

This relative amplitude is transmitted for the next period of time equal to two binary digit widths. When the binary digits 001011 appear in the register, the equation solved is $$\text{(11)}\quad K_2\,a_2=0.230(1)+0.460(1)+0.98(0)+1.96(1)-0.265(0)-0.530(0)=2.65$$

This relative amplitude is transmitted for the quaternary "two" represented by the binary digits 10. The results obtained by Equations 9 and 11 show that the level transmitted for a given digit value varies over a wide range in this system.

At first glance, it appears that since a response cannot precede the signal change which produces this response, a given digit cannot effect the preceding digits. It must be remembered, however, that the absolute transmission delay on a wire line frequently is relatively large so that small ripples in the response to a signal step can precede the main response to this step by several digit widths. Thus, without violating the law of cause and effect, a given digit can be effected by the digits which follow this given digit. This fact accounts for the necessity for considering the digit $a_1$ in Equation 2, for example.

The adjustments of the switches and potentiometers in FIGS. 1 and 2 can be made experimentally. For this purpose a fixed code pattern is transmitted and observations are made at the receiving end, from which the required adjustments of the first and third potentiometers, that is 45 and 47 in FIG. 1, can be readily made.

The general type of apparatus shown in FIG. 1 could be placed in the receiver or at the receiving end, instead of in the transmitter, or at the transmitting end of the transmission system. For distortion compensation at the receiving station the equations would be re-arranged so that the digit values, *a's*, would be expressed in terms of the relative, decisive, center amplitudes, $F(-1)$, $F(0)$, $F(1)$, etc., instead of vice versa, as fully explained in my application for Inter-Symbol Interference Corrector Ser. No. 133,966, filed Aug. 25, 1961. The necessary adjustments of the potentiometers are more easily performed at the receiver than at the transmitter because, at the receiver, the results of the adjustments are more readily observed. Compensation at the transmitter is generally more reliable, however, because, the digit values used in the compensation are more reliably known at the transmitter.

It should be noted that the invention simultaneously corrects for amplitude distortion, delay distortion and even some non-linear distortion. The apparatus of the invention is less expensive and complex than any other known device for achieving a comparable degree of distortion compensation.

It is evident that two particular examples of the invention have been described to illustrate the principles thereof, but obviously many variations of the arrangements herein disclosed can be readily made. It is important, therefore, to note that the invention is not limited to the particular arrangements disclosed herein, but is defined by the following claims.

What is claimed is:

1. Apparatus for converting digital data from a first code to a second code having a higher radix and compensating for interdigital interference, comprising first means for supplying serial digits of the first code, first and second shift registers, second means for feeding odd digits from said first means to the first shift register and even digits from said first means to the second shift register, third means connected to said shift registers for causing them to shift after every second digit, fourth means for obtaining an output pulse from each stage of said shift registers, fifth means for adjusting the amplitudes of the output pulses of said first register relative to the output pulses of the second register according to said second code and for adjusting the amplitudes of the output pulses of successive stages of the shift registers relative to one another to values which compensate said interference, and means for superimposing all said adjusted output pulses.

2. Apparatus according to claim 1, wherein said fifth means includes a pair of resistors connecting each pair of corresponding stages of the shift registers to a nodal point, and an output resistor connected between each nodal point and ground.

3. Apparatus according to claim 1, wherein said second means is a shift register.

4. Apparatus according to claim 1, wherein said fourth means derives output pulses from corresponding stages of said registers which are inverted relative to the output pulses from other stages of the registers.

5. Apparatus for compensating for interdigital interference, comprising first means for supplying serial binary digits, first and second shift registers, second means for feeding said digits alternately to said first and second shift registers, third means connected to said shift registers for causing them to shift after every second pulse, fourth means for obtaining an output pulse from each stage of said shift registers, fifth means for reducing the amplitudes of the output pulses of said first register relative to the amplitudes of the output pulses of the second register to produce pulses of quaternary code values and for adjusting the amplitudes of the output pulses of successive stages of the shift registers relative to one another to values which compensate said interference, and means for superimposing all said output pulses.

6. Apparatus for compensating for interdigital interference, comprising first means for supplying serial binary digits, a plurality of shift registers, second means for feeding said digits in turn to said plurality of shift registers, third means connected to said shift registers for causing them to shift simultaneously after a number of pulses equal to the number of shift registers, fourth means for obtaining an output pulse from each stage of said shift registers, fifth means for adjusting the amplitudes of the output pulses of one register relative to the output pulses of another register according to a second code and for adjusting the amplitudes of the output pulses of successive stages of the shift registers relative to one another, and means for superimposing all said output pulses.

7. Apparatus for transmitting a series of digital signal pulses through a given transmission medium comprising a first and a second shift register each having a plurality of stages, means for impressing the first of each pair of digital signal pulses on the first shift register and the second digital signal pulse of each pair on the second shift register, a source of clock pulses connected to the shift registers for shifting the signal pulses stored in the shift registers from one stage to another, means for obtaining a plurality of output pulses from the stages of each shift register simultaneously and adjusting the amplitudes of the simultaneous output pulses relative to one another by amounts sufficient to compensate for the distortion of the signal pulses produced by the transmission medium, means for combining the output of each stage of the second shift register with the output of the corresponding stage of the first shift register, and means for combining the output pulse of all stages to produce a compensated pulse.

References Cited by the Examiner

UNITED STATES PATENTS

| | | | |
|---|---|---|---|
| 2,845,219 | 6/1958 | Piel | 235—155 |
| 2,857,100 | 10/1958 | Franck et al. | 235—153 |
| 2,907,525 | 10/1959 | Hobbs et al. | 235—155 |
| 2,969,912 | 1/1961 | Reynolds | 235—153 |
| 2,977,047 | 3/1961 | Bloch | 235—153 |
| 3,018,954 | 1/1962 | Piel | 235—155 |

MAYNARD R. WILBUR, *Primary Examiner.*

MALCOLM MORRISON, LLOYD W. MASSEY, DARYL W. COOK, *Examiners.*

D. M. ROSEN, W. J. KOPACZ, *Assistant Examiners.*